3,438,984
TRIS-β-CHLOROACRYLYLHEXAHYDRO-
s-TRIAZINES

Joseph Adrian Hoffman, Bridgewater Township, Somerset County, N.J., assignor to American Cyanamid Company, Stamford, Conn., a corporation of Maine
No Drawing. Filed Dec. 17, 1965, Ser. No. 514,690
Int. Cl. C07d 55/14; C08f 21/00
U.S. Cl. 260—248        2 Claims

ABSTRACT OF THE DISCLOSURE

A compound of the formula:

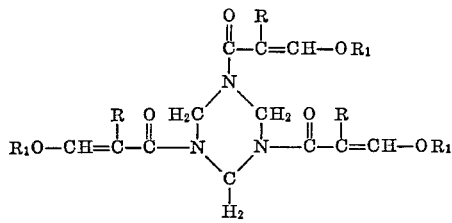

wherein each R is individually hydrogen or lower alkyl, and each $R_1$ is lower alkyl. These compounds are useful as a co-agent in the vulcanization by conventional methods of ethylene-propylene rubbers; and as a comonomer in the preparation of unsaturated polyester resins of the alkyd type.

---

This invention relates to, and has as its object, the provision of a new class of compounds. More particularly, it relates to 1,3,5-tris[(β-lower alkoxy)acrylyl]hexahydro-s-triazines of the formula:

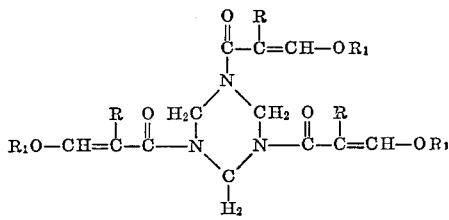

wherein each R is individualy selected from the group consisting of hydrogen, halo (e.g., chloro) and lower alkyl and each $R_1$ is lower alkyl. The compounds of Formula I are useful as a co-agent in the vulcanization by conventional methods, of ethylene-propylene rubbers; and as a comonomer in the preparation of unsaturated polyester resins of the alkyd type (e.g., as a comonomer with phthalic or maleic anhydride and ethylene glycol in the preparation of a polyester resin).

The compounds of this invention can be prepared by reacting one mole of a 1,3,5-tris(β-haloacrylyl)hexahydro-s-triazine of Formula II with three moles of an alkali metal lower alkoxide (e.g., sodium methoxide, ethoxide, etc.).

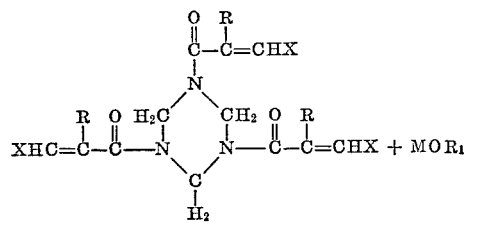

In the above equation, M is an alkali metal, X is halo (e.g., chloro or bromo) and R and $R_1$ are as defined above.

The 1,3,5-tris(β-haloacrylyl)hexahydro-s-triazine of Formula II can be prepared by reacting formaldehyde with a β-haloacrylonitrile in the presence of concentrated sulfuric acid. For example, 1,3,5-tris(β-chloroacrylyl) hexahydro-s-triazine may be made by reacting β-chloroacrylonitrile with paraformaldehyde in the presence of concentrated sulfuric acid.

The reaction between the 1,3,5-tris(β-haloacrylyl)hexahydro-s-triazine and the alkali metal alkoxide is carried out in a solvent medium such as the corresponding anhydrous lower alkanol, e.g., anhydrous methanol, isopropanol, etc.

The products may be isolated by any convenient method. For example, after filtration to remove insolubles, the solvent may be evaporated to yield the product as an oil. The compounds of this invention are normally stable, viscous liquids.

In the following example, the parts and percentages are by weight.

EXAMPLE I

Tris(β-methoxyacrylyl)hexahydro-s-triazine

A. Into a suitably equipped flask was added 143.0 parts of β-chloroacrylonitrile (1.63 moles), 0.3 part of sulfur and 17.0 parts of acetic anhydride. This mixture was stirred and slowly treated with 5.7 parts of 97% sulfuric acid, then with 57 parts of paraformaldehyde (95%) (1.8 moles); the temperature gradually rose to about 80° C. When addition was complete, the reaction mixture was allowed to stir an additional two hours. The mixture was then cooled to about 60° C., and to the thick amber solution resulting was added 4.6 parts of sodium hydroxide and 21.7 parts of trisodium phosphate dodecahydrate ($Na_3PO_4 \cdot 12H_2O$) dissolved in 115 parts of water. The gum which formed at this point partially crystallized on standing. Extraction and crystallization from isopropanol yielded tris(β-chloroacrylyl)hexahydro-s-triazine.

B. Into a suitably equipped reaction vessel was added 1.2 parts of sodium methoxide dissolved in absolute methanol. This mixture was cooled and to it with stirring was added 1.7 parts of the reaction product of Part A. The sodium chloride which separated in a short time was removed by filtration and the clear solution remaining was evaporated to yield tris(β-methoxyacrylyl)hexahydro-s-triazine as an oil.

What is claimed is:
1. A compound of the formula:

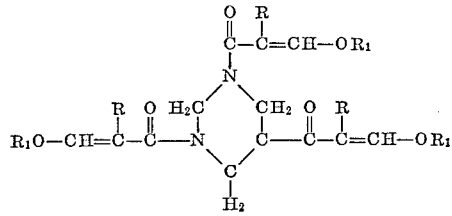

wherein each R is individually hydrogen or lower alkyl, and each $R_1$ is lower alkyl.
2. Tris(β-methoxyacrylyl)hexahydro-s-triazine.

References Cited

UNITED STATES PATENTS 2,651,631   9/1953   Zerner et al. _____ 260—248
3,016,281   1/1962   Kropa et al. _____ 260—248 XR
3,028,385   4/1962   Batzer et al. _____ 260—248

HENRY R. JILES, Primary Examiner.
JOHN M. FORD, Assistant Examiner.

U.S. Cl. X.R.
260—878, 868

UNITED STATES PATENT OFFICE
CERTIFICATE OF CORRECTION

Patent No. 3,438,984                                       April 15, 1969

Joseph Adrian Hoffman

It is certified that error appears in the above identified patent and that said Letters Patent are hereby corrected as shown below:

Column 2, lines 47 to 51, the formula should appear as shown below:

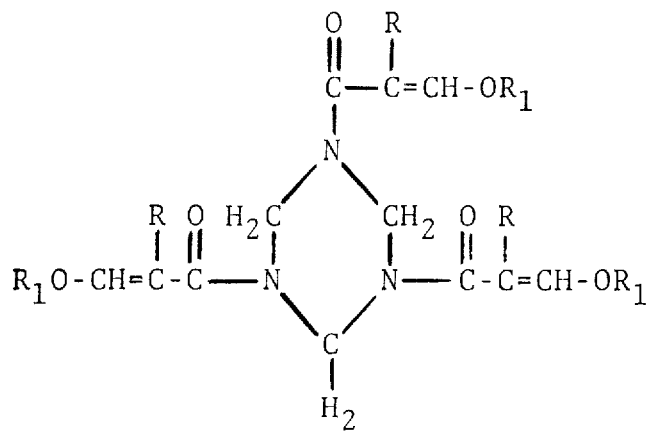

Signed and sealed this 7th day of April 1970.

(SEAL)
Attest:

EDWARD M. FLETCHER, JR.                     WILLIAM E. SCHUYLER, JR.
Attesting Officer                              Commissioner of Patents